UNITED STATES PATENT OFFICE 2,017,021

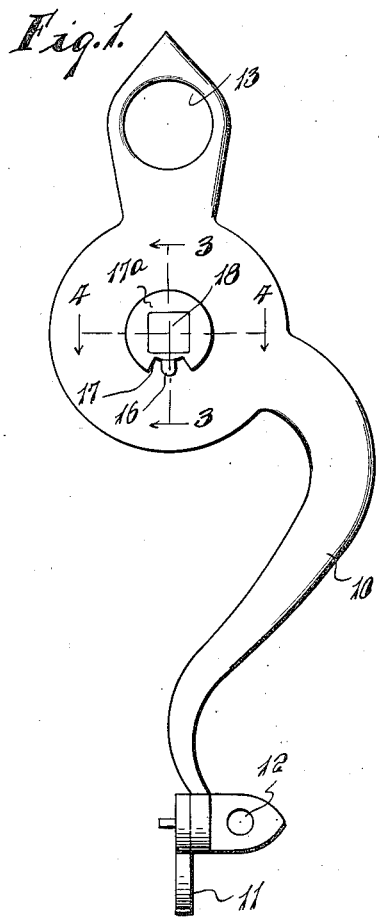
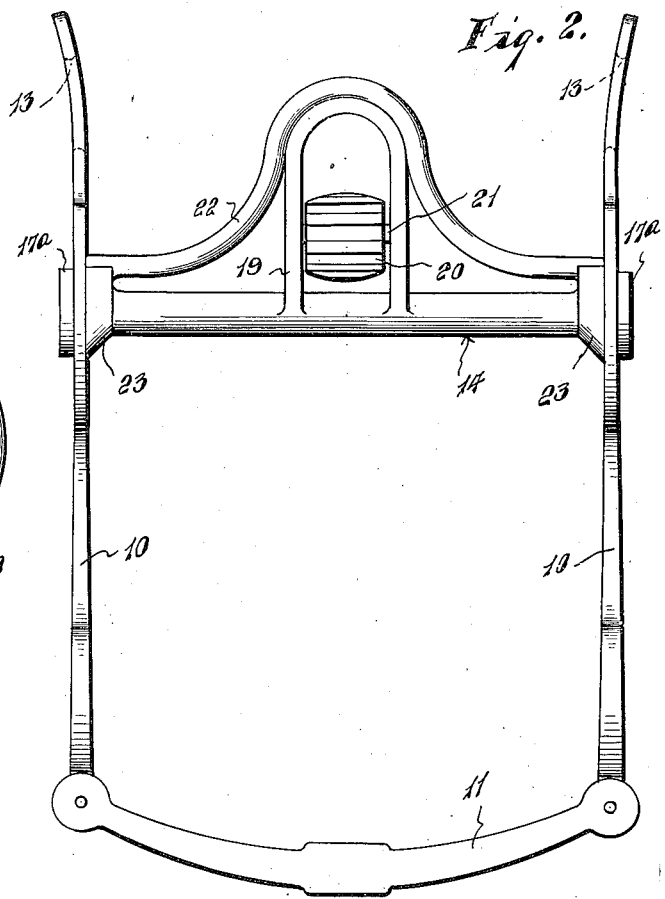
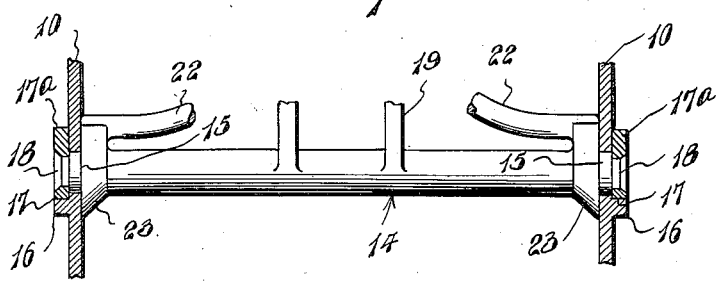
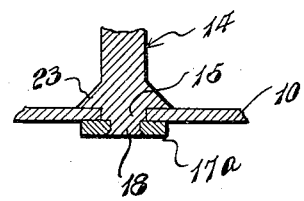

BRIDLE BIT

Thomas W. Tepper, Alturas, Calif.

Application April 18, 1935, Serial No. 17,106

6 Claims. (Cl. 54—7)

This invention relates to a bridle bit primarily adapted for use in training young horses under the saddle and for use on riding animals.

It is particularly aimed to provide a construction wherein the mouthpiece bar has limited rotation with respect to the cheek or side pieces and is connected thereto in a novel manner, particularly avoiding exposed slots or the like which frequently pinch and injure the animal, a construction wherein the parts forming the joints are suitably braced and used with or without a curb, and a construction wherein the mouthpiece bar normally rests on the tongue of the animal and rotates into contact with the roof of the mouth of the animal, through friction, as the cheek pieces or side bars are moved when pressure is applied upon the reins.

The more specific objects and advantages will become apparent from a consideration of the description following taken in connection with accompanying drawing illustrating an operative embodiment.

In said drawing:—

Figure 1 is a side elevation of the bridle bit;

Figure 2 is a plan view thereof;

Figure 3 is a detail section taken on the line 3—3 of Figure 1; and

Figure 4 is a detail section taken on the line 4—4 of Figure 1.

Referring specifically to the drawing wherein like reference characters designate like or similar parts, a cheek piece or plate 10 is provided on each side of the bit rigidly connected together at the front by a bar 11, having elements 12 at the junctions to facilitate attachment of the reins. Openings 13 are also provided at the rear of the device for attachment of the proper reins.

Disposed transversely of the cheek pieces 10 is a mouthpiece bar 14 which is journaled at 15, fitting snugly in the cheek pieces for rotation to an extent limited by lugs or projections 16 on the cheek pieces, disposed in notches or marginal slots 17 of any desired extent, in rings or burrs 17a, fastened rigidly to the mouthpiece bar by upsetting rivets 18 thereagainst. Said rivets 18 are integral with the ends of the mouthpiece bar, are square in cross section and fit correspondingly shaped openings in the rings.

As desired, the mouthpiece bar may or may not be provided with a curb member 19 having a roller 20 journaled on a rod 21 thereof.

In any event, a brace bar 22 is provided which is integrally united by welding or otherwise at its terminals, with disks or enlargements 23 integral with the mouthpiece bar 14 and bearing against the inner surfaces of the cheek pieces 10. Said brace 22 is also preferably integrally united by welding or otherwise to the curb member 19.

In the use of the device, the mouthpiece bar 14 is disposed within the mouth of the animal with the cheek pieces 10 exteriorly of the mouth and along the sides thereof, connected in the usual manner to the reins and harness. Normally the mouthpiece bar 14 and curb parts 19 and 20 and brace 22 rest on the tongue of the animal. When pressure is applied by the reins on the cheek pieces 10 due to the engagement of the parts with the tongue as described, the friction between the various elements connecting such parts to the cheek piece bars will cause motion of the cheek piece bars to rotate the mouthpiece bar and curb into contact with the roof of the mouth of the animal. Usually the motion or movement of the mouthpiece bar has the desired effect on the animal, but when it does not, the mouthpiece bar, curb and brace form substantially a rigid structure or abutment in engagement with the roof of the mouth of the animal, which of course the animal does not like, and quickly but without cruelty or injury effects the desired control.

It will be understood that the part connecting the mouthpiece bar snugly and intimately fits the cheek pieces and avoids any openings, gaps, slots or the like within the mouth of the animal which might catch the flesh, or any parts which would produce wear to such an extent as to render the parts loose and apt to catch or pinch portions of the mouth of the animal.

Various changes may be resorted to provided they fall within the spirit and scope of the invention.

What is claimed is:—

1. A bridle bit of the class described having cheek pieces, a mouthpiece bar journaled in said cheek pieces, and imperforate enlargements on the mouthpiece bar continuous about the same and in intimate contact with the cheek pieces.

2. A bridle bit of the class described having cheek pieces, a mouthpiece bar journaled in said cheek pieces, imperforate enlargements on the mouthpiece bar continuous about the same and in intimate contact with the cheek pieces, and a brace member connected to said enlargement extending from one to the other.

3. A bridle bit of the class described having cheek pieces, a mouthpiece bar journaled in said cheek pieces, imperforate enlargements on the mouthpiece bar continuous about the same and in intimate contact with the cheek pieces, a brace member connected to said enlargement extending from one to the other, and a curb extending from the mouthpiece bar to the brace element and connected to both of them.

4. A bridle bit of the class described having cheek pieces, a mouthpiece bar journaled in said cheek pieces, imperforate enlargements on the mouthpiece bar continuous about the same and in intimate contact with the cheek pieces, and means on the outer ends of the mouthpiece bar coacting with the cheek pieces to limit the rotation of the mouthpiece bar.

5. A bridle bit of the class described having cheek pieces, a mouthpiece bar journaled in said cheek pieces, imperforate enlargements on the mouthpiece bar continuous about the same and in intimate contact with the cheek pieces, rings on the outer end of the mouthpiece bar in engagement with the cheek pieces, said rings having slots, and projections on the cheek pieces disposed in said slots to limit the rotation of the mouthpiece bar.

6. A bridle bit of the class described having cheek pieces, a mouthpiece bar journaled in said cheek pieces, imperforate enlargements on the mouthpiece bar continuous about the same and in intimate contact with the cheek pieces, rings on the outer end of the mouthpiece bar in engagement with the cheek pieces, said rings having slots, projections on the cheek pieces disposed in said slots to limit the rotation of the mouthpiece bar, a curb member extending from the mouthpiece bar, and a brace rigid with said curb member and said enlargements.

THOMAS W. TEPPER.